UNITED STATES PATENT OFFICE.

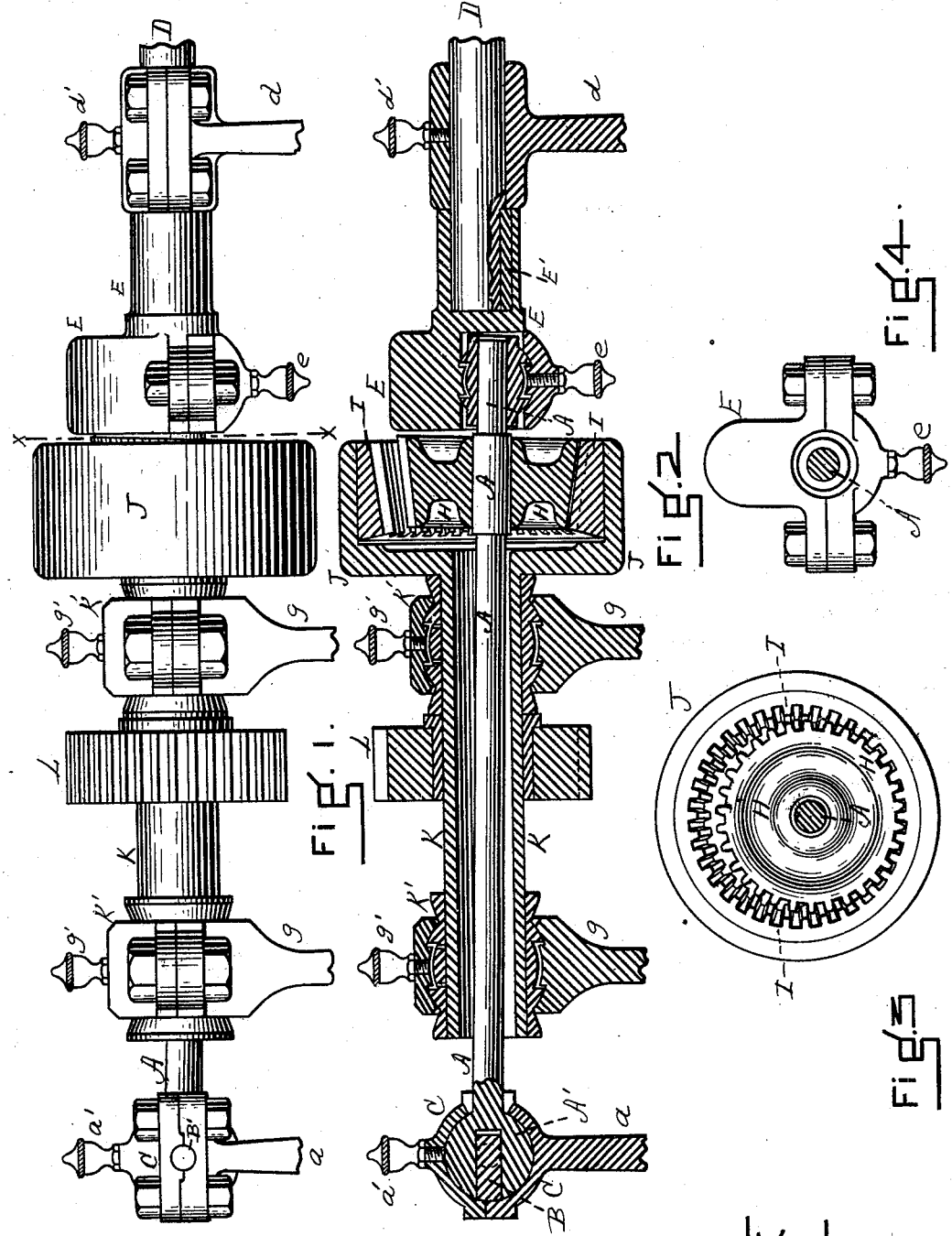

OLIVER C. SMITH, OF IPSWICH, MASSACHUSETTS, ASSIGNOR TO THE ELECTRIC RAPID TRANSIT COMPANY, OF NEW HAMPSHIRE.

MECHANICAL MOVEMENT.

SPECIFICATION forming part of Letters Patent No. 422,356, dated February 25, 1890.

Application filed August 14, 1889. Serial No. 320,765. (No model.)

*To all whom it may concern:*

Be it known that I, OLIVER C. SMITH, of Ipswich, in the county of Essex and State of Massachusetts, have invented a new and Improved Mechanical Movement, of which the following is a specification.

This is a mechanical movement for quickly reducing the speed of shafting or motors without the employment of large gears or trains of gears, and the nature of the device is fully illustrated in the accompanying drawings, in which—

Figure 1 is a side elevation. Fig. 2 is a longitudinal vertical section. Fig. 3 is a cross vertical section on line $x$, Fig. 1, looking toward the left; and Fig. 4 is a cross vertical section on line $x$, Fig. 1, looking toward the right.

Similar letters of reference indicate like parts.

A is a counter-shaft, provided with the integral ball A' at its outer end, said ball being chambered out or slotted to receive the plate or block B, provided with lugs B', bearing in the box or cap C, supported by the standard $a$, and provided with an ordinary oil-cup $a'$, the whole forming a universal joint, the center of which is on a line with the center of the driving-shaft D. The opposite end of the counter-shaft A lies in a box E, keyed by a spline E' (or similar device) to the driving-shaft D, so that the centers of the said shaft D and the counter-shaft A are at a distance of, say, one-fourth of an inch from being on a line.

$d$ is a standard for supporting the driving-shaft, and $d'$ and $e$ are ordinary oil-cups. It will be seen that when the driving-shaft D is rotated the box E rotates with it and revolves that end of the counter-shaft A around a circle of which a line through the center of the shaft D is the center. As this counter-shaft A swings around, it does not rotate on its axis, and the end at the universal joint is pivotal, the other end only describing a circle in its revolution. The motion is similar to a crank motion.

H is a bevel pinion-gear having, say, thirty-two teeth fixed on the counter-shaft A, near the end next the driving-shaft and meshing into an internal bevel gear-wheel I, having, say, thirty-six teeth, fixed to a shell J, which is integral with a tubular shaft K. The shell J, tubular shaft K, and driving-shaft D are concentric, and a straight line drawn from the center of the universal joint would pass through the axes of the tubular shaft K, shell J, and driving-shaft. The diameter of the tube in the shaft K is large enough to admit of the motion (above described) of the counter-shaft. This shaft K has bearings at K' K' and is supported by standards $g$ $g$, $g'$ $g'$ being oil-cups.

L is an ordinary gear wheel or pulley fixed on the shaft K, by means of which motion may be communicated to other shafts or machines. The bevel-pinion H being revolved by the crank motion of the counter-shaft A meshes into the teeth of the internal bevel gear-wheel and moves it around, the extent of the movement being the difference between the pitch circumference of the wheel and pinion—that is, if the pinion H has thirty-two teeth and the wheel I thirty-six teeth, the pinion in one revolution of the driving-shaft engages all the teeth of the bevel-wheel save four, and consequently moves the wheel I and shell J around the distance of four teeth only. As the wheel has thirty-six teeth and is moved to the extent of four teeth only for each revolution of the driving-shaft, said shaft must make nine revolutions to make one revolution of the shell, and hence speed is reduced from nine to one. So, if the wheel had eighty teeth and the pinion seventy-six teeth, the driving-shaft would have to make twenty revolutions to one of the shell, and speed would be reduced from twenty to one.

Having thus fully described my invention, what I claim, and desire to secure by Letters Patent, is—

The combination, with the driving-shaft D and box E, of the counter-shaft A, one end of which is supported in said box out of line with the center of the driving-shaft, the universal joint, and plate or block B, provided with the lugs B', substantially as and for the purpose described.

OLIVER C. SMITH.

Witnesse:
JOHN A. ENOS,
GUSTAVUS KINSMAN.